United States Patent Office 3,105,853
Patented Oct. 1, 1963

3,105,853
BIS(CHLOROARALKYL AMIDINES)
Arthur F. McKay, Beaconsfield, Quebec, and David L. Garmaise, Montreal, Quebec, Canada, and Ronald W. Kay, Hull, England, assignors to Monsanto Canada Limited, La Salle, Quebec, Canada, a Canadian company
No Drawing. Filed Oct. 28, 1960, Ser. No. 65,576
Claims priority, application Great Britain Nov. 30, 1959
6 Claims. (Cl. 260—564)

This invention relates to substituted bisamidines, their production and bacteriostatic compositions containing them.

According to a first feature of the present invention there are provided substituted bisamidines of the general formula:

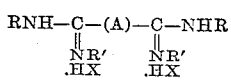

wherein R is a substituted benzyl group containing one or two chlorine atoms, R' is a hydrogen atom or a substituted benzyl group containing one or two chlorine atoms, (A) is an alkylene group having from 4 to 12 carbon atoms, a phenylene, or a tolylene group, and X is an organic ion such as benzenesulphonate or an inorganic ion such as chloride.

Such active substances as are disclosed in the prior art having some chemical analogy to those of the present invention are either highly toxic, and hence not suitable for medicinal use, or are of low bacteriostatic activity. Substances of the above general formula in which R is a substituted phenyl group have some bacteriostatic activity, but not of the order required for practical application. Unexpectedly the substituted bisamidines of the present invention are potent bacteriostats effective against gram-negative as well as gram-positive organisms. Another important factor with respect to the utility of these compounds is that they remain highly active in the presence of serum. Substances of this general formula in which (A) is for instance a hexamethylene group have also very low toxicity. A substituted bisamidine containing this group was shown to have a low oral toxicity for mice of 1.4 g. per 1 kilogram of body-weight.

Thus, for example, N,N'-bis-(3,4-dichlorobenzyl)-sebacamidine dihydrochloride inhibits the growth of the following organisms at the dilution indicated: Staph. pyogenes (penicillin sensitive) (1:2,560,000), Staph. pyogenes (penicillin resistant) (1:5,120,000), Sarcina lutea (1:10,240,000), Strept. faecalis (1:640,000), E. coli No. 198 (1:640,000), Aero aerogenes (1:80,000), S. pullorum (1:160,000), Ps. aeruginosa (1:40,000), Pr. mirabilis (1:40,000), Pr. vulgaris (1:40,000).

N,N'-bis-(3,4-dichlorobenzyl) - 2,4-tolylenediacetamidine dihydrochloride inhibits the growth of the following organisms at the dilutions indicated: Staph. pyogenes (penicillin sensitive) (1:2,560,000), Staph. pyogenes (penicillin resistant) (1:1,280,000), Sarcina lutea (1:5,120,000), Strept. faecalis (1:640,000), E. coli No. 198 (1:640,000), Aero aerogenes (1:80,000), S. pullorum (1:160,000), Ps. aeruginosa (1:80,000), Pr. mirabilis (1:80,000), Pr. vulgaris (1:40,000).

According to a further feature of the invention, compounds of the foregoing general formula are produced by heating a mixture of a dinitrile of the formula NC—(A)—CN, in which (A) is an alkylene group having from 4 to 12 carbon atoms, a phenylene, or a tolylene group, and the benzenesulphonate salt of a substituted benzylamine preferably at a temperature of 210° C. to 235° C. for a period of 40 to 90 minutes. During the heating period the reaction mixture is preferably maintained in an inert atmosphere. The product may be isolated from the reaction mixture by fractional crystallisation as the dibenzenesulphonate salt. The dibenzenesulphonate salt may be converted to the dihydrochloride salt by extracting the free diamidine from a basic solution of the dibenzenesulphonate, followed by the addition of hydrogen chloride to the free base. However, a preferred process is to pass a methanol solution of the dibenzenesulphonate salt through a column of Amberlite IRA-400 ion-exchange resin previously saturated with chloride ion. The dihydrochloride salt may then be isolated from the effluent in high yield. Some of the diamidine dihydrochlorides have been obtained as monohydrates.

The amidine salts produced in the manner described herein may be readily converted to the free bases by addition of an amount of a strong base, i.e. sodium hydroxide, equivalent to the acid anion of the salt or alternatively, by passage of the amidine salt through a column of ion-exchange resin in the hydroxide form.

In accordance with a further feature of the invention, there are provided bacteriostatic compositions comprising substituted bisamidines of the foregoing general formula, compounded in minor amounts with major amounts of a carrier. The word "carrier" is used in a general sense to denote a pharmaceutically acceptable substance or substances physically compounded with the active agent to assist the active substance in effecting contact with bacteria and thus to form a product which can be used practically as a bacteriostatic agent. The composition may also contain other active constituents. The active substances of the invention are used preferably in the form of tablets for internal use and in the form of an ointment or salve for external application.

Thus, for example, one effective composition is a tablet made by mixing the active substance with a dry carrier made up of a filler, for example starch or milk sugar or both, and a lubricating agent, for example talc or stearic acid or both. These constituents are thoroughly mixed and then compressed into slugs, the slugs being subsequently ground and screened to provide granules. The granules are compressed into tablets. A conveniently effective concentration of the active substance in a tablet is generally from about 25 mg. to about 300 mg. per tablet.

A salve or ointment may be made, for example by incorporating 2 to 10% by weight of the active substance in a water-miscible greaseless base ointment as a carrier, and mixing the product in a roller type ointment mill. This ointment can be used for topical applications in the treatment of infected skin areas.

The following examples will serve to illustrate the invention.

EXAMPLE I

N,N'-Bis-(4-Chlorobenzyl)-Adipamidine 4-chlorobenzylamine (42.5 parts) and benzenesulphonic acid (52.2 parts) were dissolved in boiling methanol (800 parts). On cooling, the solution deposited crystals of 4-chlorobenzylamine benzenesulphonate (59.2 parts, 65.7% yield) melting at 273–276° C.

The salt (50.0 parts) was heated with adiponitrile (9.0 parts) at 230° C. for 90 minutes. During the heating period the mixture was stirred in an atmosphere of nitrogen. The crude reaction product was crystallized from methanol (150 parts) and unchanged starting material (24.1 parts) was recovered, M.P. 255° to 260° C. The mother liquors were evaporated and the residue was crystallized from methanol (30 parts)-ether (50 parts), giving N,N'-bis-(4-chlorobenzyl)-adipamidine dibenzenesulphonate, M.P. 193 to 194° C. Yield 6.4 parts (10.9%).

The melting point was raised to 194 to 196° C. by recrystallisation from methanol.

Analysis of this compound gave 54.34% carbon, 5.24% hydrogen, 9.63% chlorine, 7.83% nitrogen and 8.62% sulphur as compared with the theoretical calculated for $C_{32}H_{36}Cl_2N_4O_6S_2$ of 54.30% carbon 5.13% hydrogen, 10.03% chlorine, 7.92% nitrogen and 9.06% sulphur.

The dibenzenesulphonate salt (4.48 parts) was dissolved in water (30 parts) and sodium hydroxide solution (13.1 ml. of 0.968 N sodium hydroxide solution) was added. The precipitated free base was extracted with chloroform (75 parts) and hydrogen chloride was passed through the dried chloroform solution. The dihydrochloride (1.24 parts, 42% yield) melted at 204 to 205° C. after recrystallisation from ethanol-ethyl acetate. Analysis of this compound gave 50.26% carbon, 5.60% hydrogen, 29.31% chlorine and 11.70% nitrogen as compared with the theoretical calculated for $C_{20}H_{26}Cl_4N_4 \cdot H_2O$ of 49.80% carbon, 5.85% hydrogen, 29.42% chlorine and 11.62% nitrogen.

EXAMPLE II

*N,N'-Bis-(2,4-Dichlorobenzyl)-Adipamidine*

2,4-dichlorobenzylamine (35.2 parts) was added to a solution of benzenesulphonic acid (35.2 parts) in methanol (500 parts). The solution was concentrated to one-third of its volume, giving 2,4-dichlorobenzylamine benzenesulphonate, melting at 189 to 192° C. Yield, 47.4 parts (69.5%).

A mixture of the salt (46.5 parts) and adiponitrile (7.51 parts) was heated with stirring to 240° C. (bath temperature) until a homogeneous salt was formed (twenty minutes). The heating was continued at 210° C. for twenty minutes. Crystallisation of the reaction mixture from methanol and from water gave N,N'-bis-(2,4-dichlorobenzyl)-adipamidine dibenzenesulphonate, melting at 196 to 198° C. Yield 11.3 parts (20.9%). Analysis of this compound gave 49.50% carbon, 4.40% hydrogen, 17.64% chlorine, 7.48% nitrogen and 7.92% sulphur, as compared with the theoretical calculated for $C_{32}H_{34}Cl_4N_4O_6S_2$ of 49.50% carbon, 4.41% hydrogen, 18.26% chlorine, 7.22% nitrogen and 8.25% sulphur.

The dibenzenesulphonate salt (4.5 parts) was dissolved in methanol (140 parts) and the solution was passed through a column of Amberlite IRA–400 resin (58 parts) which had been previously saturated with chloride ion. The column was washed with methanol (100 parts) and the eluate and washings were evaporated. The residue was recrystallised from methanol-ether to give the dihydrochloride melting at 224 to 226° C. Yield 2.6 parts (84.7%). Analysis of this compound gave 45.07% carbon, 4.41% hydrogen, 39.88% chlorine and 10.23% nitrogen as compared with the theoretical calculated for $C_{20}H_{24}Cl_6N_4$ of 45.06% carbon, 4.54% hydrogen, 39.89% chlorine and 10.51% nitrogen.

EXAMPLE III

*N,N'-Bis-(3,4-Dichlorobenzyl)-Adipamidine*

3,4-dichlorobenzylamine (35.2 parts) and benzenesulphonic acid (35.2 parts) were dissolved in methanol (500 parts). Concentration of the methanol to one-third of its volume gave 3,4-dichlorobenzylamine benzenesulphonate, melting at 244 to 248° C. Yield 50.7 parts (75.9%).

A mixture of the salt (47.0 parts) and adiponitrile (7.62 parts) was heated with stirring at 235° C. for 35 minutes. Some unchanged starting material (15.7 parts) was removed by crystallisation from methanol (120 parts). The residue from the mother liquors was recrystallised from water to give N,N'-bis-(3,4-dichlorobenzyl)-adipamidine dibenzenesulphonate, melting at 213.5–215.5° C. Yield, 6.0 parts (11.4%).

Analysis of this compound gave 49.61% carbon, 4.40% hydrogen, 17.70% chlorine, 7.47% nitrogen, and 8.02% sulphur as compared with the theoretical calculated for $C_{32}H_{34}Cl_4N_4O_6S_2$ of 49.50% carbon, 4.41% hydrogen, 18.26% chlorine, 7.22% nitrogen and 8.25% sulphur.

The dibenzenesulphonate was converted to the dihydrochloride in 85.4% yield exactly as described in Example II. The dihydrochloride melted at 242 to 244° C. after recrystallisation from methanol-ether. Analysis of this compound gave 45.07% carbon, 4.40% hydrogen, 39.66% chlorine and 10.18% nitrogen as compared with the theoretical calculated for $C_{20}H_{24}Cl_6N_4$ of 45.06% carbon, 4.54% hydrogen, 39.89% chlorine and 10.51% nitrogen.

EXAMPLE IV

*N,N'-Bis-(3,4-Dichlorobenzyl)-Suberamidine*

3,4 - dichlorobenzylamine benzenesulphonate (13.4 parts) and suberonitrile (2.7 parts) were heated with stirring at 230° C. for 50 minutes. Crystallisation from methanol (40 parts) yielded some unchanged starting material (4.0 parts) melting at 232–240° C. Addition of ether (40 parts) to the filtrate precipitated N,N'-bis-(3,4-dichlorobenzyl)-suberamidine dibenzenesulphonate melting at 187 to 192° C. Yield, 2.9 parts (17.9%). Recrystallisation from methanol-ether raised the melting point to 197.5 to 198.5° C. Analysis of this compound gave 50.73% carbon, 5.00% hydrogen, 17.59% chlorine, 7.13% nitrogen and 7.88% sulphur as compared with the theoretical calculated for $C_{34}H_{38}Cl_4N_4O_6S_2$ of 50.75% carbon, 4.76% hydrogen, 17.63% chlorine, 6.96% nitrogen and 7.97% sulphur.

The dibenzenesulphonate was converted to the dihydrochloride in 88.4% yield exactly as described in Example II. The dihydrochloride melted at 187 to 188° C. after recrystallisation from ethanol-ether. Analysis of this compound gave 47.38% carbon, 5.15% hydrogen, 10.02% chlorine and 37.64% nitrogen as compared with the theoretical calculated for $C_{22}H_{28}Cl_6N_4$ of 47.09% carbon, 5.03% hydrogen, 9.98% chlorine, 37.90% nitrogen.

EXAMPLE V

*N,N'-Bis-(3,4-Dichlorobenzyl)-Sebacamidine*

3,4 - dichlorobenzylamine benzenesulphonate (13.4 parts) and sebaconitrile (3.3 parts) were heated with stirring at 230° C. for one hour. Crystallisation from methanol yielded some unchanged starting material (3.2 parts) melting at 236 to 243° C. The mother liquors gave a single spot on a paper chromatogram. The methanolic solution was passed through a column of Amberlite IRA–400 resin in the chloride form, giving N,N'-bis-(3,4-dichlorobenzyl)-sebacamidine dihydrochloride as an amorphous solid. Yield, 8.2 parts (69.6%).

EXAMPLE VI

*N,N'-Bis-(3,4-Dichlorobenzyl)-1,10-Decanedicarboxamidine*

3,4 - dichlorobenzylamine benzenesulphonate (16.7 parts) and 1,10-dicyanodecane (4.8 parts) were heated with stirring at 230° C. for one hour. Crystallisation from methanol-ether yielded some unchanged starting material (3.1 parts) melting at 237–240° C. The mother liquors gave a single spot on a paper chromatogram. The methanolic solution was passed through a column of Amberlite IRE–400 resin in the hydrochloride form giving N,N'-bis-(3,4-dichlorobenzyl)-1,10-decanedicarboxamidine dihydrochloride as an amorphous solid. Yield, 12.7 parts (81%).

EXAMPLE VII

*N,N'-Bis-(3,4-Dichlorobenzyl)-1,12-Dodecanedicarboxamidine*

3,4 - dichlorobenzylamine benzenesulphonate (10.0 parts) and 1,12-dicyanododecane (3.3 parts) were heated with stirring at 230° C. for one hour. Crystallisation from methanol-ether yielded some unchanged starting material (3.6 parts) melting at 228 to 242° C. The mother liquors were passed through a column of Amberlite IRA-400 resin in the hydrochloride form, giving N'N'-bis-(3,4-dichlorobenzyl) - 1,12 - dodecanedicarboxamidine dihydrochloride as an amorphous solid. Yield, 6.0 parts (61.5%). The product gave a single spot on a paper chromatogram.

EXAMPLE VIII

*N,N'-Bis-(3,4-Dichlorobenzyl)-p-Phenylenediacetamidine* p-Xylene dicyamide (2.1 parts) and 3,4 - dichlorobenzylamine benzenesulphonate (8.9 parts) were stirred at 230° C. for one hour. Crystallisation from methanol yielded N,N'-bis-(3,4-dichlorobenzyl)-p-phenylenediacetamidine dibenzenesulphonate melting at 292 to 293.5° C. Yield 3.4 parts (38.1%). Recrystallisation from methanol raised the melting point to 304 to 304.5° C.

Analysis of this compound gave 52.30% carbon, 4.23% hydrogen, 17.45% chlorine, 6.98% nitrogen and 7.88% sulphur as compared with the theoretical calculated for $C_{36}H_{34}Cl_4N_4O_6S_2$ of 52.44% carbon, 4.16% hydrogen, 17.20% chlorine, 6.79% nitrogen and 7.78% sulphur.

The dibenzenesulphonate (3.0 parts) was converted to the dihydrochloride (2.4 parts), M.P. 169° C., by passage through a column of Amberlite IRA-400 resin in the chloride form. Yield 93%. The dihydrochloride (0.4 part), which was partially hydrated, was added to 0.1 N sodium hydroxide solution (14.7 parts), and the precipitated free base, N,N'-bis-(3,4-dichlorobenzyl)-p-phenylenediacetamidine, M.P. 159 to 160° C., was recovered by filtration. Yield, 0.34 part (99%). Analysis of this compound gave 56.64% carbon, 4.68% hydrogen, 27.70% chlorine and 10.77% nitrogen as compared with the theoretical calculated for $C_{24}H_{22}Cl_4N_4$ of 56.71% carbon, 4.36% hydrogen, 27.91% chlorine and 11.02% nitrogen.

EXAMPLE IX

*N,N'-Bis-(3,4-Dichlorobenzyl)-2,4-Tolylenediacetamidine*

A mixture of 3,4-dichlorobenzylamine benzenesulphonate (20 parts) and 2,4-di-(cyanomethyl)-toluene (5.1 parts) was stirred at 235° C. for one hour. Crystallisation from methanol-ether yielded some unchanged starting material (4.1 parts) melting at 172 to 246° C.

The mother liquors were passed through a column of Amberlite IRA-400 resin in the hydrochloride form to yield N,N'-bis-(3,4-dichlorobenzyl) - 2,4 - tolylenediacetamidine dihydrochloride as an amorphous solid, yield 13.6 parts (75.9%). The product gave a single spot on a paper chromatogram.

EXAMPLE X

*N,N,N',N'-Tetrakis-(3,4-Dichlorobenzyl)-Sebacamidine*

Sebacyl chloride (23.9 parts) dissolved in benzene (40 parts) was added dropwise to a stirred solution of 3,4-dichlorobenzylamine (35.2 parts) and pyridine (15.8 parts) in benzene (240 parts). The temperature was maintained at 15°-20° C. during the addition period of 30 minutes. The mixture was allowed to stand overnight and the precipitated solid was recovered by filtration. The precipitate was washed with water and then recrystallised from methanol (300 parts) to yield N,N'-bis-(3,4-dichlorobenzyl) - sebacamide, M.P. 135-136° C. Yield, 38 parts (69.5%).

A solution of N,N'-bis-(3,4-dichlorobenzyl)-sebacamide (5.2 parts) and phosphorus pentachloride (4.2 parts) in benzene (60 parts) was refluxed for 3.5 hours. The solution was evaporated to dryness under reduced pressure. The residue (4.8 parts) dissolved in benzene (40 parts) was added to 3,4-dichlorobenzylamine (6.0 parts) in benzene (10 parts) and the resulting suspension was allowed to stand overnight. The semi-solid precipitate was separated by filtration and was then partitioned between sodium hydroxide solution (20 parts) and ether (80 parts). The ether solution was evaporated, and the only residue was extracted with petroleum ether (50 parts) to remove the unreacted 3,4-dichlorobenzylamine. The residual N,N,N',N'-tetrakis-(3,4 - dichlorobenzyl) - sebacamidine was dissolved in ethanol (40 parts) and acidified with hydrochloric acid. Evaporation of the solution gave N,N,N',N'-tetrakis - (3,4 - dichlorobenzyl - sebacamide dihydrochloride as an amorphous solid which gave a single spot on a paper chromatogram. Yield, 3.8 parts (42%).

EXAMPLE XI

*Tablets*

N,N'-bis-(3,4 - dichlorobenzyl) - sebacamidine dihydrochloride (1000 grams), starch (150 grams), gum acacia (2 grams), milk sugar (470 grams), talc (176 grams) and stearic acid (2 grams) are mixed thoroughly in a mechanical mixer and compressed into slugs. The material is ground and screened to give No. 14 to No. 16 mesh granules. These granules are compressed into tablets with a ¼ inch concave punch. Each tablet contains approximately 100 mg. of active ingredient.

We claim:

1. Compounds having the formula:

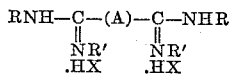

wherein R is a benzyl group substituted with at least one and not more than two chlorine atoms, R' is one of the group consisting of a hydrogen atom and R, (A) is one of the group consisting of an alkylene group having from 4 to 12 carbon atoms, a phenylene group and a tolylene group and X is one of the group consisting of benzenesulphonate and hydrochloride.

2. N,N' - bis-(3,4-dichlorobenzyl)-suberamidine dihydrochloride.

3. N,N' - bis-(3,4-dichlorobenzyl)-sebacamidine dihydrochloride.

4. N,N' - bis-(3,4-dichlorobenzyl)-1,10-decandedicarboxamidine dihydrochloride.

5. N,N' - bis-(3,4-dichlorobenzyl)-1,12-dodecanedicarboxamidine dihydrochloride.

6. N,N'-bis-(3,4-dichlorobenzyl)-2,4-tolylenediacetamidine dihydrochloride.

References Cited in the file of this patent

UNITED STATES PATENTS 2,433,489    Short et al. _____ Dec. 30, 1947

OTHER REFERENCES

Braun et al.: Ber. Deut. Chem., vol. 65, pages 1574–1580 (1932).

Oxley et al.: J. Chem. Soc. (London), vol. of 1949, pages 449–456.

Birtwell: J. Chem. Soc. (London), vol. of 1952, pages 1279–1286.

Nochod et al.: "Ion Exchange Technology," pages 12 to 22 (1956).

Whitehead: J.A.C.S., vol. 80, pages 2185–2189 (1958).